April 8, 1952
A. J. F. CLEMENT ET AL
2,592,009
HYDRAULIC FORCE MEASURING DEVICE
WITH ELECTRICAL INDICATOR
Filed Feb. 1, 1946
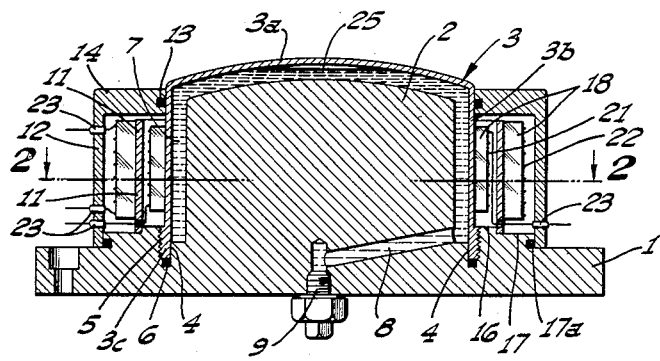
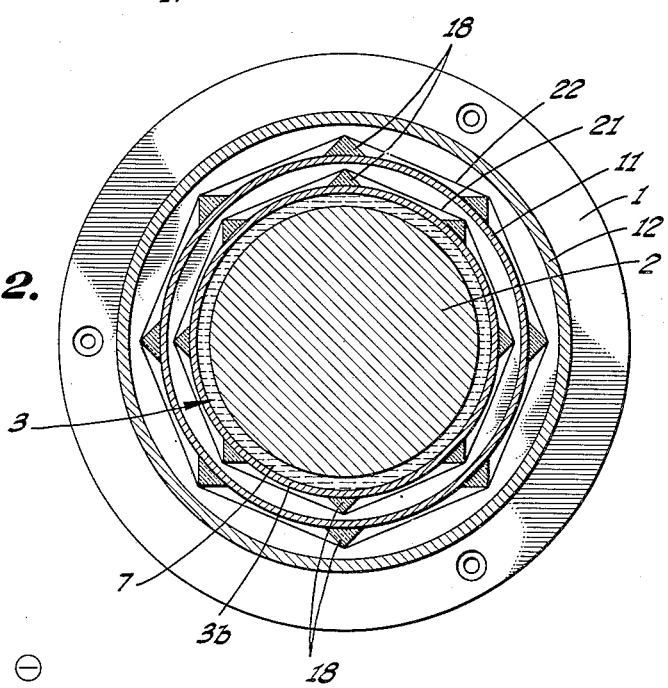
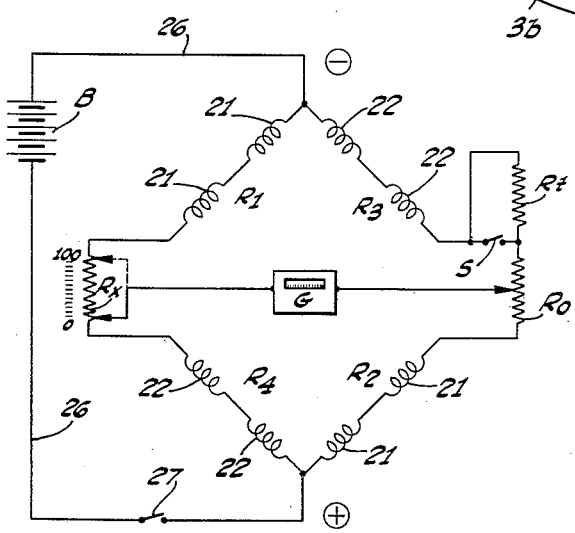
ANTHONY J. F. CLEMENT,
JOHN W. KETTL,
INVENTORS.
BY
ATTORNEY.

Patented Apr. 8, 1952

2,592,009

UNITED STATES PATENT OFFICE 2,592,009

HYDRAULIC FORCE MEASURING DEVICE WITH ELECTRICAL INDICATOR

Anthony J. F. Clement, Culver City, Calif., and John W. Kettl, Memphis, Tenn.

Application February 1, 1946, Serial No. 644,792

11 Claims. (Cl. 73—141)

The present invention relates generally to force measuring devices and more particularly to force measuring devices or weighing machines of a hydroelectric nature. More specifically the invention resides in a force measuring device or weighing machine in which the force to be measured, or object to be weighed, is applied to or placed upon a hydraulic support to increase the internal pressure thereof whereby certain electrical conductors are stressed to vary their electrical resistance which is then measured to determine the force or weight.

The invention finds particular utility in its application to the measurement of very heavy weights, and will be specifically illustrated and described in that specific adaptation, though without implied limitation thereto, since it may be utilized in various other force measurement applications.

It is a well known phenomenon that electrical conductors vary in resistance with variations in the tension under which they are placed, the relationship being linear so long as the elastic limit of the conductor is not exceeded. Use has been made of this known phenomenon in the weighing machine constructed in accordance with the present invention which also includes an improved hydraulic support for the weight, the internal pressure of which increases directly with the increase in weight to vary the resistance of a conductor by changing the tension therein, the electrical resistance varying directly with the tension and being measurable to determine the value of an applied weight.

It is an object of the present invention to provide a new and novel hydroelectric weighing or force measuring device in which the applied weight is translated into measurable electrical resistance in a new and novel manner.

A further object of the invention is to provide a new and novel support for objects to be weighed by the hydroelectric method.

In accordance with a preferred embodiment of the present invention, the weight-receiving support embodies a liquid containing capsule having walls arranged for expansion under the internal hydraulic pressure incident to application of external weight to the capsule. Mounted on these expansive walls in a manner to be strained thereby is a resistance wire of the type commonly used in strain gauges. The variations in resistance of this wire with strain resulting from imposition of weight on the capsule may be measured in any suitable manner, though the invention includes a form of Wheatstone bridge circuit for this purpose having certain special advantages for purposes of balancing, tare set-off and temperature compensation, as will appear. As a preferred feature of the invention, the resistance wire on the capsule is placed in an oil bath, which serves to protect the resistance wire against air currents and thus eliminates short time interval ambient temperature fluctuations and consequent resistance variations, as well as to equalize temperature conditions in different portions of the wire and so eliminate undesirable temperature differentials. As changes in temperature affect the electrical resistance of the wire, compensating electrical resistances are provided which are subjected to the same temperature changes and the variations in the resistance of which, with such changes, offset any variations which occur in the major resistances.

The Wheatstone bridge circuit includes adjustable resistances which, by their inclusion, make it possible to use a scale calibrated directly in terms of the total weight or with the tare subtracted.

Referring now to the drawings in which a preferred embodiment of the invention is disclosed:

Fig. 1 is a vertical transverse section through the weight supporting unit constructed in accordance with the present invention and discloses the mounting of the weight-measuring and compensating conductors;

Fig. 2 is a horizontal cross-section upon the line 2—2 of Fig. 1; and

Fig. 3 is a diagrammatic showing of the electrical circuits in which the physical structure of Figs. 1 and 2 is incorporated.

Referring against to the drawings, and to Figs. 1 and 2 in particular, it is seen that the weight-supporting structure includes a base 1 which is adapted to be secured to any suitable support and which includes a centrally located upwardly extending plug 2. A thin walled capsule 3 having preferably a domed top 3a and cylindric side wall 3b fits over the plug 2, and has an enlarged lower end portion 3c seated in an annular groove 4 sunk in base 1 around plug 2, a screwthreaded connection being provided between the wall portion 3c and the opposed wall of the groove as indicated at 5. Suitable sealing means 6 are provided in the bottom of the groove 4 to provide a fluid-tight chamber 7 between capsule 3 and the plug 2 which it surrounds and from which it is spaced at all points. Space or chamber 7 is filled with a suitable liquid, preferably mercury because of its low thermal expansion, and is connected to a filling and emptying conduit 8, the open end of which is closed by a plug 9 in the bottom of base 1.

Concentric with the side wall of capsule 3 are spaced annular walls 11 and 12, the latter being formed with an inwardly turned top section 14 which may abut the side of capsule 3 and which is provided at the point of juncture with a ring seal 13. Walls 11 and 12 seat against stepped shoulders 16 and 17, respectively, formed upon the top surface of the base 1 so as to prevent their lateral displacement, shoulder 17 being recessed and provided with a ring seal 17a. It is seen that the wall or closure member 12 is sealed at its ends to the base 1 and to the capsule 3 and provides a closed chamber which entirely encircles the side wall of capsule 3 and is adapted to be filled with a nonconducting fluid, preferably dehydrated transformer oil. The upper edge of inner wall 11 is spaced below the top portion 14 of the closure member 12 so that there is in fact only one oil chamber and one body of oil which is free to circulate to insure that all parts of the chamber are at the same temperature. The oil performs the additional valuable function of serving as an insulator to protect the interior of the chamber from variations in atmospheric temperature which are conveyed by the air currents.

Extending vertically at spaced circumferential intervals upon the outer peripheral surfaces of capsule 3 and also upon wall 11 are a plurality of fixedly secured supports or bridge elements 18 of insulating material such as plastic. These bridge elements are triangular in cross-section, as is clearly shown in Fig. 2, and are of such height above their supporting surfaces as to support a conducting wire wound thereon in spaced relationship to the wall upon which they are mounted. Individual resistance wires are wound around the bridge elements on the capsule 3 and the wall 11 and are indicated by the reference characters 21 and 22, respectively. These wires describe multi-sided figures around and spaced outside their supporting walls, as is shown in Fig. 2. The wires are of a metal such as constantan, which is approximately of constant resistance at all temperatures. The opposite ends of the wires extend outwardly through the closure 12 at insulating seals 23 of suitable insulating cement, glass or the like, being mechanically connected to the last support or bridging element 18, as by cementing, before making their exit from the oil chamber. The wires are wound with an initial tension, which however is insufficient that their elastic limit will be reached under the maximum stress that may be exerted under load conditions. The body of oil surrounding all of the conducting wires serves to protect against air drafts such as would otherwise cause temperature and resistance fluctuations, as well as to equalize temperature differentials in different portions thereof by reason of convection currents set up in the oil. Although the coil 21 surrounding the capsule might be wound directly on the capsule, the use of the insulation bridge elements is of value in that it positions the wire coil out of contact with the metal capsule and so practically eliminates current leakage paths to the usually electrically grounded metal parts of the device. The oil bath aids in insulation, and prevents condensation of atmospheric moisture on the surfaces of the bridge such as might permit leakage currents to ground. The bridge elements furthermore support the coil out of direct heat conductive relationship with the capsule, permitting better heat equalization by the surrounding oil. Spacing the coil from the capsule has also the incidental advantage of reducing capacity to ground.

The capsule 3 is of very thin durable metal of about .05" wall thickness, being preferably "hogged" out of a solid billet of heat treated steel, and is contoured to have a relatively flat dome shape at the top for a reason presently to appear. The mercury within the space is poured therein with both the mercury and the entire supporting unit heated to about 150° F. When the space 7 and the conduit 8 are completely filled so that mercury runs out the filling opening, the plug 9 is inserted. As the capsule and the mercury cool, the mercury, having the higher coefficient of expansion, contracts to a greater extent to form a small vacuum bubble 25 which finds its way to the very uppermost part of the dome. This bubble is actually filled with mercury vapor at very low pressure and serves to provide a take-up for the expansion of the mercury which inevitably takes place with changes in the ambient temperature and which would otherwise result in the expansion of the enclosing capsule 3. Clearly the mercury temperature can increase to the very unlikely temperature of 150° F. before it exerts an expanding pressure upon the enclosing capsule 3. The above discussion presupposes that the top wall of the capsule is stiff enough to withstand the low pressure created by the bubble 25 without collapsing. If the top wall is more flexible, it may collapse and remove the bubble 25, but the same benefits will obviously be obtained as before, since an increase in temperature will merely move the partially collapsed dome outwardly somewhat to accommodate the increased volume of the mercury. The same take-up feature is thus present.

The domed shape of the capsule with a plug 2 largely filling it is also a relationship of particular importance in that it makes possible the use of a relatively small volume of mercury, thereby eliminating excessive volume and pressure variations with temperature change. It makes it possible for a relatively small bubble to perform the aforementioned function without difficulty. Additionally, the top of the plug provides a safety support for the object being weighed, should the mercury escape, for its close juxtaposition to the domed surface insures that the object could drop only a very small distance.

The weighing unit is adapted to be placed on a suitable fixed support and the object to be weighed placed upon the domed surface of capsule 3, where it will first flatten or deform the dome sufficiently to remove the aforementioned "bubble," and will then, as the capsule assumes the load, increase the internal pressure of the mercury in the space 7 surrounding the plug 2. The increased internal hydraulic pressure, which is of course proportional to the load imposed, is transmitted to the side walls of the capsule, setting up an expansive stress therein, and causing them to strain or bulge outwardly in accordance with Hooke's law. The wires 21, being carried by the supports 18 on the side wall of the capsule, are thereby placed under tension and their diameter decreases and their overall length increases as the capsule side walls are forced outwardly. As previously indicated, there is an increase in the resistance of the wires concurrent with the tensioning which is directly proportional thereto. This increase in resistance is directly proportional to the increase in pressure in the mercury which in turn is directly proportional to the weight placed upon the capsule 3.

To measure the increase in the resistance of the wire 21 caused by the tensioning thereof, it is connected in the electrical circuit shown diagrammatically in Fig. 3 which is seen to resemble the well known Wheatstone bridge. A plurality of the conductors 21 (here four in number) are seen to be incorporated in two diagonally opposite legs of the bridge, these legs being indicated at $R_1$ and $R_2$. Each conductor 21 is included in a weighing unit of the type described, it being understood that the object to be weighed may be rested simultaneously upon a plurality of the units. Connected between the resistance legs $R_1$ and $R_2$ formed by the wire 21 are the resistance legs $R_3$ and $R_4$ which comprise a plurality of conductors 22. Conductors 22, as will be recalled, are positioned within the same body of oil as are the conductors 21 and are provided in order to compensate for temperature variations which take place in the wires 21 and which, even though they be of a substantially constant resistance under variable temperatures, will have some variation.

The basic Wheatstone bridge formula is:

$$\frac{R_1}{R_4}=\frac{R_3}{R_2}$$

When this equation holds, and with current flowing through the bridge from a battery B by means of a conductor 26 which connects to the junctions of $R_1$, $R_3$, and $R_4$, $R_2$, respectively, there should be no reading upon the galvanometer G which is connected at the junctions of $R_1$, $R_4$, and $R_3$, $R_2$, respectively.

Because the resistances of the conductors embodied in the circuit will vary, however, and because it is desired to determine those variations in order to determine the weight which has been impressed upon the various weighing units, there is provided a variable resistance or potentiometer $R_x$ between $R_1$ and $R_4$. $R_x$ is of relatively small resistance and is, with the adjustment in the zero position, in series with $R_1$. Potentiometer $R_x$ is calibrated, as will be hereinafter fully explained, to read in terms of pounds or tons.

Upon the opposite side of the bridge from the potentiometer $R_x$ is positioned a resistance $R_0$ which is connected directly to resistance $R_2$ and through a switch S to resistance $R_3$. The connection of the galvanometer G to resistance $R_0$ is adjustable so that the latter can be so divided between $R_2$ and $R_3$ as to compensate for the presence of potentiometer $R_x$ and to provide a zero reading at G with no weight upon the capsule 3.

For reasons which will be explained, there is also provided an additional resistance $R_t$ which is connected around switch S and between $R_0$ and $R_3$ and through which current only flows when switch S is open.

Considering now the operation of the device constructed in accordance with the present invention, let it be assumed that switch 27 included in lead 26 of the battery B is closed and current flows through the various resistances. It will also be assumed that switch S is closed and that the potentiometer $R_x$ has been set to its zero position. The potentiometer $R_0$ is then adjusted until the galvanometer G reads zero.

Before placing a weight upon any or all of the units, let it be assumed that a temperature change takes place which inevitably results in some change in the resistances of conductors 21. With equal inevitability, this temperature change produces a change in the resistance of compensating resistance conductors 22. As the increase in resistances of $R_1$, $R_2$, $R_3$, and $R_4$ are equal, or at least the ratio of the change in $R_1$ to $R_4$ is the same as the change in $R_3$ to $R_2$, it follows that the basic ratio $$\frac{R_1}{R_4}=\frac{R_3}{R_2}$$

remains constant and the galvanometer will continue to indicate no potential difference.

Let it now be assumed that a weight is placed upon one of the units, thereby depressing the dome of capsule 3 and placing the mercury therein under pressure. The sidewalls of capsule 3 expand, as described, the conductor 21 is placed under tension and its resistance increases. Let it be further assumed that the resistance increase is in one of the conductors 21 of $R_1$. As resistance $R_1$ is now increased, it is seen that the ratio $R_1/R_4$ is now greater than $R_3/R_2$ and the galvonometer G will indicate this unbalance. Compensation is obtained by moving the adjustment of the potentiometer $R_x$ to remove resistance from $R_1$ and place it in $R_4$ until the ratio $R_1/R_4$ is again equal to the ratio of $R_3/R_2$. When this ratio has been obtained, the galvanometer will again read zero and the weight which is then placed upon the weighing unit can be read directly from the calibrated $R_x$.

The weighing of a plurality of objects upon the four weighing units indicated by the conductors 21, or the weighing of a single object which rests upon all four units, is clearly within the range of the operation of the device. Thus an increase in the resistance of both conductors 21 of resistance $R_1$ would function as previously described and the reading obtained would be the indication of the summation of that resistance. Let it be further assumed, however, that resistance of the conductors 21 of $R_2$ is also increased. Reference to the formula indicates that an increase in the resistance of $R_2$ unbalances the relationship just as though the unbalance were in $R_1$. If $R_2$ is increased, then the ratio of $R_3/R_2$ is decreased, and it becomes necessary to remove resistance from $R_1$ to make the ratio $R_1/R_4$ equal to the same value. If simultaneously the resistance of $R_1$ was increased by increase in the resistance of its conductor 21, then clearly the reduction thereof by the taking out of resistance in $R_x$ will serve to also balance the equation.

In the operation of the circuit, the reading which has been obtained upon the potentiometer $R_x$ is of the total weight placed upon any or all of the weighing units. If, however, it is desired to weigh only the contents of a container, it is possible to discount the tare thereof by opening the switch S and putting into series with $R_3$ the tare resistance $R_t$. This is understood when reference is again made to the formula, and it is assumed that tare or weight of the container effects an increase in $R_1$. Quite obviously, from a consideration of the formula, if $R_3$ is also correspondingly increased, the ratio of $R_3$ to $R_2$ again becomes the same as $R_1$ to $R_4$. If $R_t$ is of such value as to cancel the increase in $R_1$ effected by the weight of the container only, it is clear that the reading obtained upon $R_x$ will be that of the material contained within the container.

The invention described has many advantages including its simplicity and its accuracy. As set forth, it is independent of temperature variations and is capable of weighing extremely heavy objects and of being relatively light itself. While the disclosure has been of a device incorporating four weighing units, it is to be understood that any number of units can be included, the principle remaining the same, and also any force can

We claim:

1. In a force-measuring device, an inverted cupped casing having a cylindrical expansible side wall and a flexible force receiving end wall, a solid noncompressible body positioned inside said cupped casing in spaced relationship thereto, and a body of liquid in said space adapted to transmit the force on the end wall of said casing into an expanding pressure normal to said side wall, an enclosing wall surrounding said expansible wall, an electrical conductor, rigid insulating means supporting said conductor upon and spaced from said expansible wall, a temperature-compensating electrical conductor between said walls, a body of electrically insulative and heat conductive fluid between said walls and in which said conductors are positioned, and electrical means in the circuit of said conductors to measure the change in resistance in said first-named electrical conductor upon a change in the tension therein.

2. In a force-measuring device, a base formed with a centrally located projecting plug, a capsule having a flexible domed end wall and an expansible cylindrical side wall positioned around said plug and sealed to said base, a body of liquid in the space between said capsule and said plug, an electrical conductor wrapped around said expansible wall and adapted to be tensioned by the expansion thereof, and electrical means to measure the increase in the resistance of said conductor with said wall expanded by a pressure in said liquid created by the pressure therein resulting from a force directed against said domed end wall.

3. In a force-measuring device, a base formed with a centrally located upwardly projecting plug, an inverted cup-like element having a flexible domed end wall and an expansible cylindrical side wall positioned around said plug and sealed to said base to form a capsule, a body of liquid in the space between said capsule and said plug, a closure sealed to said base and to said cup-like element and forming a chamber around the latter, a body of electrically nonconducting fluid in said chamber, a first electrical conductor in said chamber and enclosing the expansible wall of said capsule and adapted to be tensioned by the expansion thereof, and a second electrical conductor supported in said chamber and adapted to be subjected to the same temperature conditions as said first conductor, said conductors extending from said chamber and being connectible to resistance measuring apparatus.

4. In a force measuring device: a sealed capsule including a force-receiving wall member adapted to be deflected inwardly in response to a force applied thereto, and an expansible circumferential side wall, a body of liquid sealed within said capsule having a volume less than that of the capsule at normal temperatures, with the remaining space within the capsule occupied by vacuum, said body of liquid functioning, after inward deflection of said wall member sufficient to take up said vacuum space, to transmit inwardly exerted pressure from said wall member to said side wall for expansion of the latter, and an electrical strain-measuring resistance wire mounted on said side wall so as to be tensioned by the expansion thereof.

5. In a force measuring device: a sealed capsule including a flexible force-receiving end wall adapted to be deflected inwardly in response to a force applied thereto, and an expansible circumferential side wall, a body of liquid sealed within said capsule, said body of liquid functioning to transmit inwardly exerted pressure from said end wall to said side wall for expansion of the latter, and an electrical strain-measuring resistance wire mounted on said side wall so as to be tensioned by the expansion thereof.

6. In a force-measuring device, a capsule including a cup-like casing forming a sealed chamber and having a collapsible force receiving end wall and an expansible side wall, a body of liquid sealed in said chamber having a higher coefficient of expansion than said capsule, and an electrical strain-measuring resistance wire mounted on said side wall and adapted to be tensioned by the expansion thereof, said body of liquid being of a volume less than that of the uncollapsed chamber at normal temperatures and said collapsible end wall being sufficiently flexible as to assume a plurality of positions and to collapse against said body of liquid under the action of atmospheric pressure at normal temperatures, said body of liquid functioning to transmit inwardly exerted pressure from said collapsible force receiving end wall to said side wall for expansion of the latter.

7. In a force-measuring device, a capsule including an inverted cup-like casing forming a sealed chamber and having a collapsible force receiving end wall and an expansible side wall, a body of liquid sealed in said chamber having a higher coefficient of expansion than said capsule and being of such volume as to create a vacuum bubble adjacent said end wall at all normal temperatures, and an electrical strain-measuring resistance wire mounted on said side wall and adapted to be tensioned by the expansion thereof, said body of liquid functioning, after sufficient collapse of said end wall to remove said vacuum bubble, to transmit inwardly exerted pressure from said force receiving end wall to said side wall for expansion of the latter.

8. In a force measuring device, a capsule, a body of liquid sealed inside said capsule and filling said capsule excepting for a relatively small vacuum bubble, said capsule including a flexible domed force-receiving wall adapted to deflect inwardly under application of external force, and an expansive wall adapted to expand under internal pressure transmitted by said liquid after inward deflection of said domed force receiving wall sufficient to take up said vacuum bubble, and a strain-measuring electrical resistance wire mounted on said expansive wall so as to be tensioned by said expansion.

9. In a force-measuring device, an inverted cupped casing having a substantially cylindrical expansible side wall and a flexible force receiving end wall, a body of liquid in said casing adapted to transmit the force on said end wall into an expanding pressure normal to said side wall, an enclosing wall surrounding and defining a chamber around said expansible side wall, a strain-measuring electrical resistance wire mounted on said side wall so as to be tensioned by said expansion, an electrical temperature-compensating resistance wire in said chamber, a body of electrically insulative and heat conductive liquid in said chamber and in which said resistance wires are positioned, and electric circuit means including said conductors to measure the change in resistance in the first mentioned resistance wire upon change in tension therein.

10. In a force-measuring device, an inverted cupped casing having a flexible force receiving top end wall of slightly domed profile and an expansible substantially cylindrical side wall, a rigid base for said casing forming a closed capsule, a body of liquid of higher coefficient of expansion than said capsule sealed within said capsule, said body of liquid being of a volume relative to the capacity of the capsule such that at all normal operating temperatures its upper surface is spaced from said domed top end wall by a vacuum bubble, and a strain-measuring electrical resistance wire mounted on and extending circumferentially of said cylindrical side wall and adapted to be tensioned by the expansion thereof.

11. In a force measuring device: a sealed capsule including a flexible force receiving end wall member adapted to deflect inwardly in response to a force applied thereto, and an expansible substantially cylindrical side wall, a body of liquid sealed within said capsule functioning to transmit inwardly exerted pressure from said end wall to said side wall for expansion of the latter, insulation wire-supporting bridge elements mounted on said side wall in circumferential spacing thereabout, and a strain-measuring electrical resistance wire wrapped circumferentially about said side wall upon said bridge elements, said bridge elements spacing said wire from said side wall, and acting to tension said wire upon expansion of said side wall.

ANTHONY J. F. CLEMENT.
JOHN W. KETTL.

REFERENCES CITED

The following references are of record in the file of this patent:

UNITED STATES PATENTS

| Number | Name | Date |
|---|---|---|
| 2,282,442 | Whitlock | May 12, 1942 |
| 2,322,319 | Ruge | June 22, 1943 |
| 2,327,935 | Simmons | Aug. 24, 1943 |
| 2,336,500 | Osterberg | Dec. 14, 1943 |
| 2,365,015 | Simmons | Dec. 12, 1944 |
| 2,398,372 | Green | Apr. 16, 1946 |
| 2,400,467 | Ruge | May 14, 1946 |
| 2,420,148 | Ostergren | May 6, 1947 |
| 2,423,620 | Ruge | July 8, 1947 |

OTHER REFERENCES

Publication: Electronics Magazine, Dec. 1943 edition, Fig. 3 on page 108 of article entitled "Strain Gages."